(12) United States Patent
Moliton

(10) Patent No.: US 9,104,025 B2
(45) Date of Patent: Aug. 11, 2015

(54) DISPLAY FOR INCORPORATING IN A PAIR OF EYEGLASSES

(75) Inventors: Renaud Moliton, Charenton-le-Pont (FR); Cécíle Bonafos, legal representative, Paris (FR)

(73) Assignee: Essilor International (Compagnie Generale D'optique), Charenton-Le-Pont (FR)

( * ) Notice: Subject to any disclaimer, the term of this patent is extended or adjusted under 35 U.S.C. 154(b) by 169 days.

(21) Appl. No.: 12/667,964

(22) PCT Filed: Jun. 19, 2008

(86) PCT No.: PCT/FR2008/051098
§ 371 (c)(1),
(2), (4) Date: Apr. 15, 2014

(87) PCT Pub. No.: WO2009/007567
PCT Pub. Date: Jan. 15, 2009

(65) Prior Publication Data
US 2014/0285898 A1 Sep. 25, 2014

(30) Foreign Application Priority Data
Jul. 10, 2007 (FR) ..................................... 07 56372

(51) Int. Cl.
*G02B 27/14* (2006.01)
*G02B 7/02* (2006.01)
*G02B 27/01* (2006.01)
*G02B 7/00* (2006.01)

(52) U.S. Cl.
CPC .......... *G02B 27/0176* (2013.01); *G02B 27/017* (2013.01); *G02B 27/0149* (2013.01); *G02B 7/002* (2013.01); *G02B 2027/0127* (2013.01); *G02B 2027/0169* (2013.01); *G02B 2027/0178* (2013.01)

(58) Field of Classification Search
CPC .. G02B 7/002; G02B 27/017; G02B 27/0176; G02B 2027/0178
USPC .................................. 359/630, 811, 818, 819
See application file for complete search history.

(56) References Cited

U.S. PATENT DOCUMENTS 5,886,822 A 3/1999 Spitzer
6,157,291 A 12/2000 Kuenster et al.
(Continued)

FOREIGN PATENT DOCUMENTS

FR 2885229 11/2006

*Primary Examiner* — William Choi
(74) *Attorney, Agent, or Firm* — Sofer & Haroun, LLP

(57) ABSTRACT

The invention relates to a display comprising an optical imager (5) for shaping light beams emitted by a light beam generator system (4), said beams being introduced into said imager via an inlet face, and for directing the beams towards the eye (O) of a wearer in order to enable an image (I) to be viewed, two hooks (10, 11) being in reference positions relative to the imager, and said light beam generator system including a connection arrangement for connection to said hooks (10, 11), the connection between said system and said hooks being releasable and said hooks (10, 11) being designed to be received in housings carried by the connection arrangement. According to the invention, said housings are arranged in such a manner that said connection arrangement is assembled on said hooks by applying thrust against one of said hooks (11), by turning about said hook, and by snap-fastening onto the other hook (10).

13 Claims, 4 Drawing Sheets

(56) References Cited

U.S. PATENT DOCUMENTS

| | | |
|---|---|---|
| 6,441,978 B1 | 8/2002 | Kobayashi et al. |
| 6,819,495 B2 * | 11/2004 | Shani et al. ................. 359/630 |
| 2008/0186586 A1 | 8/2008 | Yamamoto |

* cited by examiner

DISPLAY FOR INCORPORATING IN A PAIR OF EYEGLASSES

RELATED APPLICATIONS

This application is a National Phase application of PCT/FR2008/051098, filed on Jun. 19, 2008, which in turn claims the benefit of priority from French Patent Application No. 07 56372, filed on Jul. 10, 2007, the entirety of which is incorporated herein by reference.

BACKGROUND

1. Field of the Invention

The present invention relates to a display comprising an optical imager designed to enable information of the image or multimedia type to be projected, and preferably associated with a lens. The term "lens" is used herein to designate an optical system that is suitable in particular for being positioned in an eyeglass frame.

2. Description of Related Art

Patent U.S. Pat. No. 5,886,822 discloses a lens that presents a projection insert. Such a projection insert is constituted by an optical imager suitable for shaping light beams coming from an electronic and optical system for generating light beams on the basis of an electronic signal, of the miniature screen, laser diode, or light-emitting diode (LED) type. The optical imager directs the light beams towards the wearer's eye in order to enable the information content to be viewed.

By way of example, the optical imager of the invention is of the same type as that described in above-mentioned patent U.S. Pat. No. 5,886,822.

With reference to FIG. 1, an electronic signal carrying information is taken to a miniature screen 1 by a cable 7. On the basis of this signal, the miniature screen 1 illuminated by a back light, generates a pixel image corresponding to the information. By way of example, it is possible to use a "Kopin Cyberdisplay 320 color" screen that generates 320×240 pixel images and that presents dimensions of 4.8 millimeters (mm)×3.6 mm. The screen 1 is put into a reference position relative to the optical imager 5 by means of a mechanical interface. A protective housing protects the assembly in full or in part. Optical components 8, here a mirror and a lens, are associated with the screen 1.

The optical imager 5 comprises a propagation prism 5a, a counter-prism 5b, a quarterwave plate 5c, and a spherical Mangin mirror 5d. The spherical Mangin mirror is a plano-spherical lens with its spherical face made reflective by means of aluminum or equivalent treatment.

The imager 5 also includes polarization separation treatment 6 that may be implemented in the form of a deposit of thin layers, either on the propagation prism 5a or on the counter-prism 5b or by means of a film that is stuck between the two above-described elements.

In this example, the imager 5 is molded in the lens 9 and the housing is placed flat against the back of the lens, with reflective treatment 5e then being included in the lens. On the same principle, the housing may be disposed to one side of the lens 9, in which case the reflective element 5e is omitted.

The term "lens" is used to designate in particular an optionally corrective lens that is designed to be mounted in an eyeglass frame. This ophthalmic eyeglass lens presents traditional eyesight correcting, anti-reflection, anti-dirtying, and anti-scratching functions, for example.

The following arrangement is known for fastening the light beam generator system on the lens and also for enabling focusing to be adjusted so as to adjust the viewing distance of the information image, and consequently so as to provide the wearer with a view that is clear and comfortable. The lens is secured to an adapter constituted by a plate carrying two rods having the housing of the light beam generator system slidably engaged thereon. While making the adjustment, the housing is engaged manually to a greater or lesser extent on the slideways so as to adjust its distance, and subsequently it is locked in place by a transverse screw.

That connection and focus-adjusting device presents the following technical problems.

Depending on the depth of the engagement, the overall size of the display varies. This can give rise to constraints in the way it is made.

That type of device inevitably leads to a large amount of slack between the rods and the slideways, which can be prejudicial to the accuracy of the display.

The housing is generally made of plastics material and the plate and its rods are made of metal. As a result the housing wears quickly, thereby further increasing slack and inaccuracy of the display.

Finally, in that prior art, adjustment is performed manually in the sense that the wearer needs to take hold of the housing and slide it on the rods until good focusing is obtained. Naturally, such an arrangement is not very accurate and not very comfortable to use, being ill-suited to everyday use of a non-experimental kind.

Consequently, it is possible to envisage making a display that is fitted with a focus-adjustment device that acts by adjusting the length of the light beams between the optical elements and the imager, in which said adjustment device is included in the light beam generator system, the light beam generator system including, for example, a stationary plate having connected thereto at least one of the optical elements by means of a movable connection that is adjustable by using an actuator device.

Consequently, the connection between the light beam generator system and the lens no longer needs to enable distance to be adjusted, but it'must remain relatively discreet on the lens for reasons of appearance while nevertheless enabling it to be positioned and held in position accurately, and while also being easy to put into place.

For that purpose, patent document FR 2 885 229 proposes an ophthalmic display having an optical imager designed to shape light beams emitted by a miniature screen of a light beam generator system, which beams are introduced into said imager via an inlet face, the imager serving to direct them towards the eye of the wearer in order to enable an image to be viewed, an adapter being in a referenced position relative to the imager, and the light beam generator system including a connection arrangement connecting it to the adapter, the connection between the system and the adapter being releasable.

The adapter is constituted by two snap-fastening hooks designed to be received in housings carried by the connection arrangement. The hooks are anchored in bores arranged in the inlet face of the imager.

The connection arrangement carried by the light beam generator system includes two substantially parallel arms each carrying one of the snap-fastening housings, one of the housings being carried by a tongue arranged in one of the arms, referred to as the top arm, that is elastically deformable in a direction substantially parallel to an axis joining the axes of the housings and that is directed substantially perpendicularly to said axis.

The connection arrangement carried by the light beam generator system also includes two thrust pegs, each peg being carried by a respective arm and one of the pegs being carried by a rod that is formed in the bottom arm, being elastically deformable in a direction substantially perpendicular to an axis joining the axes of the housings and being directed substantially perpendicularly to said axis. The thrust pegs are placed on opposite sides of a longitudinal plane of the connection arrangement containing said axis.

Although the number of parts used is thus minimized, it is nevertheless found that that connection arrangement does not give complete satisfaction, since its positioning and its movements for the purpose of snap-fastening the two arms on the hooks are relatively complex. They also require the deformable tongue to be pushed so as to deform and as a result they require a force to be applied to the hooks, which are consequently rendered fragile.

OBJECTS AND SUMMARY

The invention solves those problems, and to do so it provides a display comprising an optical imager for shaping light beams emitted by a light beam generator system, said beams being introduced into said imager via an inlet face, and for directing the beams towards the eye of a wearer in order to enable an image to be viewed, two hooks being in reference positions relative to the imager, and said light beam generator system including a connection arrangement for connection to said hooks, the connection between said system and said hooks being releasable and said hooks being designed to be received in housings carried by the connection arrangement, the display being characterized in that said housings are arranged in such a manner that said connection arrangement is assembled on said hooks by applying thrust against one of said hooks, by turning about said hook, and by snap-fastening onto the other hook.

As a result, use does not require an actuator and does not require an external tool, and it takes place quickly and with ease of handling. So far as appearance is concerned, the residual parts on the information eyeglass lens, i.e. the two hooks, are very discreet.

The overall size of the connection system is minimal, both in the light beam generator system and on the lens. Its contribution to the total weight is minimal, given that the parts dedicated solely to connection are the hooks.

The advantage of this type of solution lies in it being well adapted to connecting a light beam generator system to a lens of information eyeglasses that are subject to severe mechanical, optical, size, weight, and appearance constraints.

Furthermore, performing assembly in that way requires little force to be applied to the hooks so their lifetime is thereby lengthened.

In a preferred embodiment of the invention, and preferably, said imager is incorporated in a lens of a pair of eyeglasses.

Advantageously, each of said hooks is constituted by a sphere disposed at the end of a rod.

Such a hook design is particularly advantageous since it greatly reduces any possibility of the hooks catching on fabric or elsewhere while the pair of eyeglasses is not being work by the user.

Preferably, the display includes a pusher element for pushing said connection arrangement against said hooks, said pushing being substantially perpendicular to the front face of said lens.

Said pusher element may be a flexible blade carried by said generator system and thrusting against said lens while said connection arrangement is turning.

Preferably, said thrust on one of the hooks is linear thrust perpendicular to the front face of said lens.

The housing applying said linear thrust may be formed by two projections carried by said connection arrangement and spaced apart from each other by a distance greater than the diameter of the rod of the hook.

Furthermore, and advantageously, said linear thrust is associated with a skid for applying point thrust against said lens, the skid being arranged on the connection arrangement close to the housing providing said linear thrust.

The housing providing said snap-fastening may be formed by a clip carried by said connection arrangement.

Advantageously, said hooks are disposed at respective different distances from a side edge of said lens.

Said hooks may be anchored in bores arranged in said inlet face of said imager.

Preferably, said connection arrangement is machined or molded in a plate of said light beam generator system.

In addition to being very easy to assemble, the connection arrangement as obtained in this way provides reliable isostatic fastening without residual movement, unlike the fastening achieved in the above-mentioned prior art where the flexibility of the tongues formed in the arms is difficult to calibrate.

The invention also provides a pair of eyeglasses in which at least one lens includes an incorporated imager and is provided with two said hooks in order to form such a display.

BRIEF DESCRIPTION OF THE DRAWINGS

The invention is described below in detail with the help of figures that show merely a preferred embodiment of the invention.

DETAILED DESCRIPTION

Figure 1:
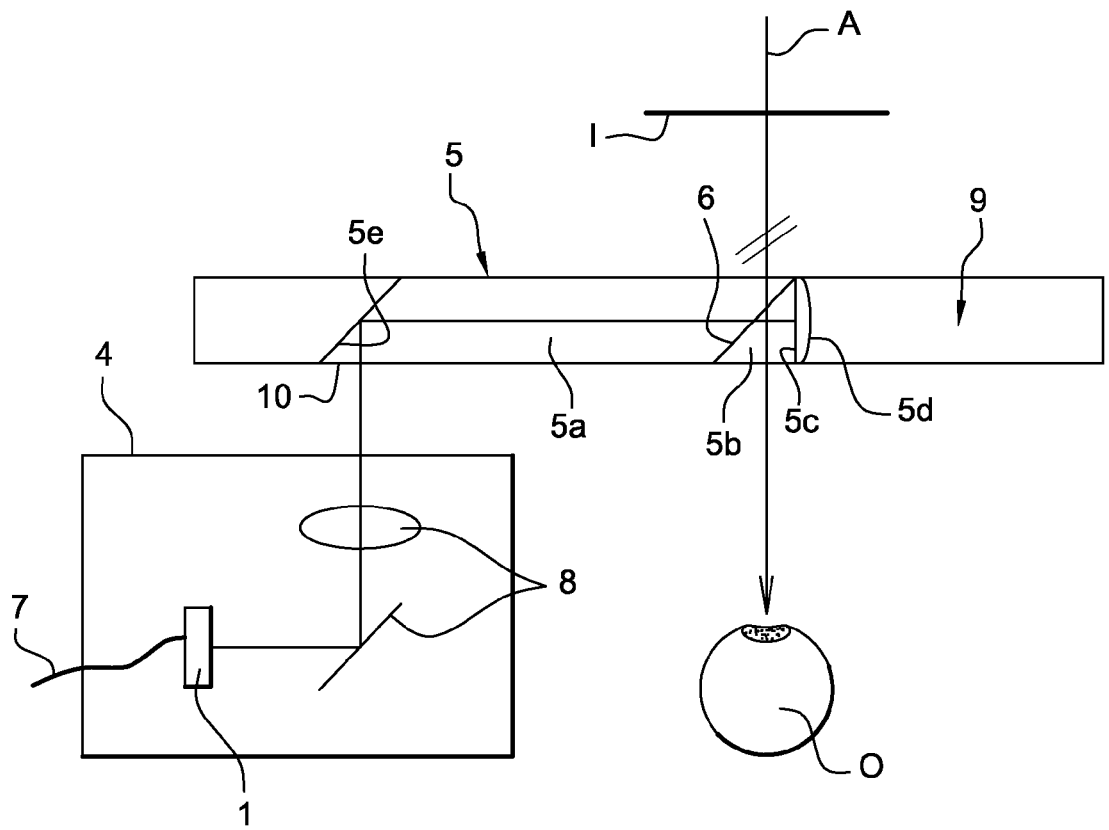
FIG. 1 is a diagrammatic view of a known display, as described above.
Figure 2:
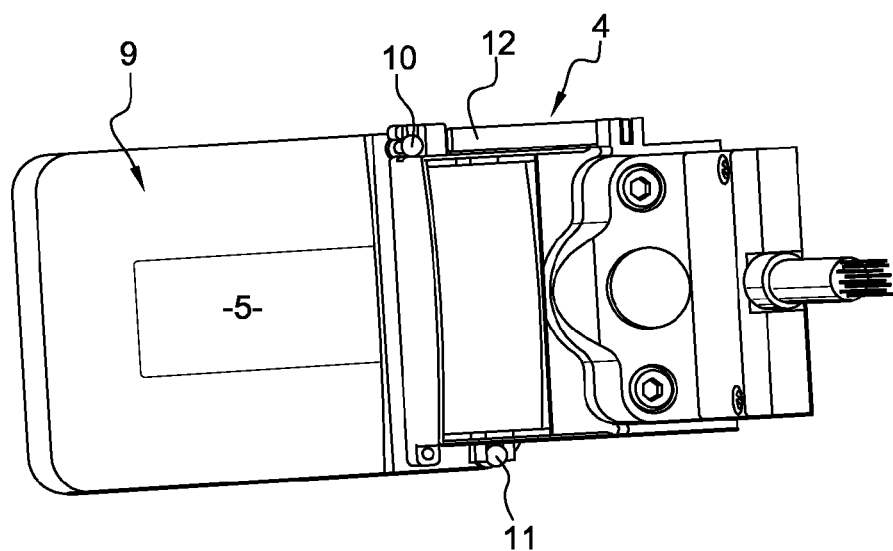
FIG. 2 is a rear view of a display in accordance with the invention.
Figure 3B:
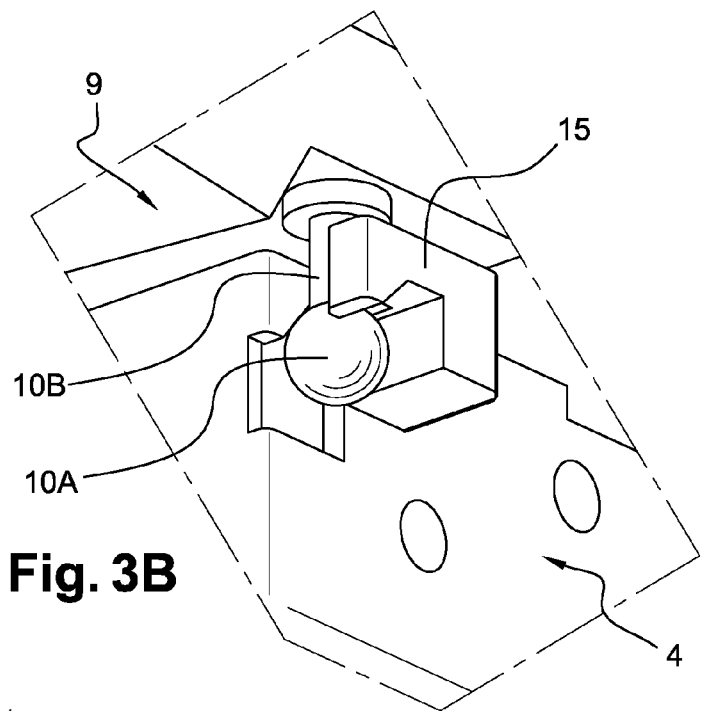
FIGS. 3A and 3B are perspective views from above of a display in accordance with the invention.
Figure 3A:
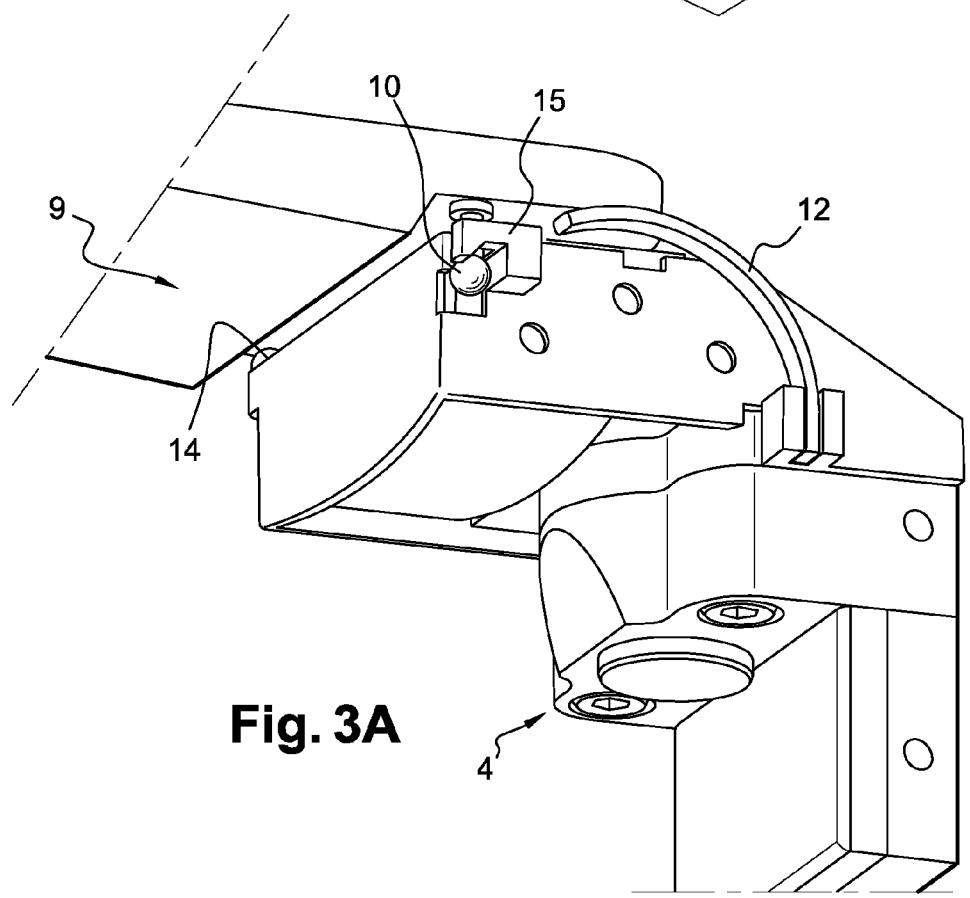
Figure 4:
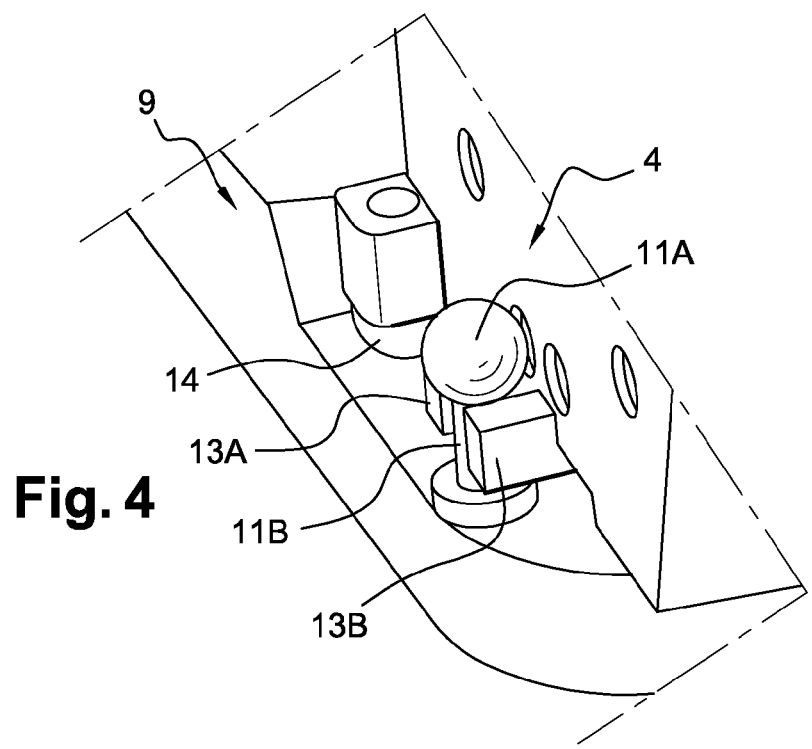
FIGS. 4 and 5 are perspective views from below of a display in accordance with the invention.
Figure 5:
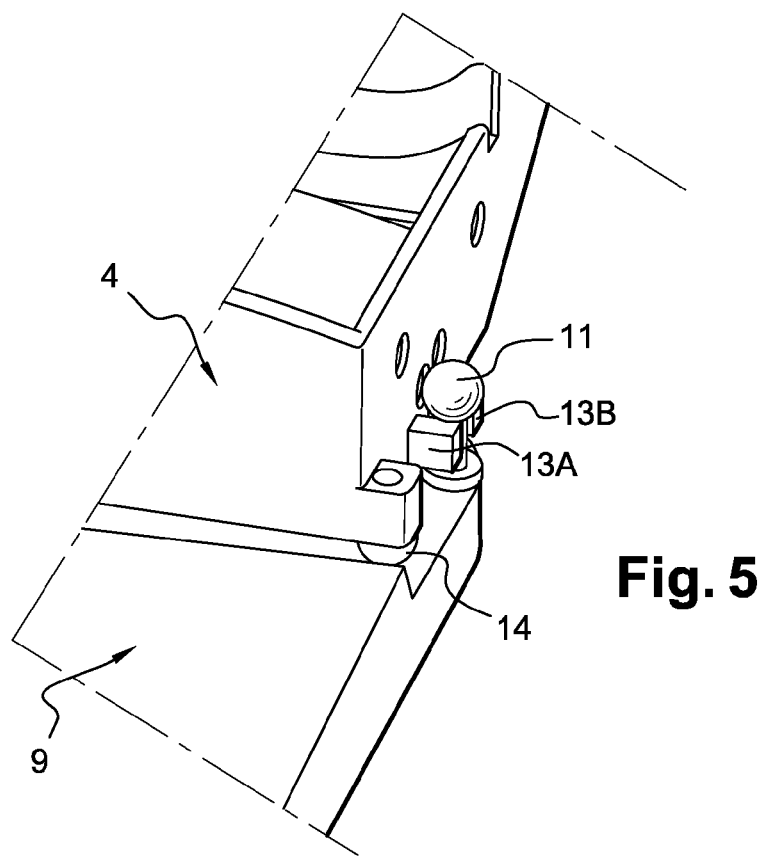

As shown in FIGS. 2 to 7, an ophthalmic display comprises an optical imager 5 for shaping light beams emitted by a light beam generator system 4, which beams are introduced into the imager via an inlet face, which imager then directs them towards the wearer's eye in order to enable an image to be viewed. The imager 5 is incorporated in a lens 9 of a pair of eyeglasses. Two hooks 10 and 11 anchored in bores of the lens 9, and arranged on the inlet face of the imager, are in reference positions relative to the imager 5 and the light beam generator system 4 includes an arrangement for connecting with the hooks, the connection between said system and the hooks being releasable.

The connection arrangement is machined or molded in a plate of the light beam generator system 4, which is preferably made of plastics material.

The hooks 10 and 11 are designed to be received in housings carried by the connection arrangement. Each of them is constituted by a sphere 10A, 11A disposed at the end of a rod 10B, 11B. They are disposed at respective different distances from the side edge of the lens 9.

The display also includes a thrust element for urging the connection arrangement against the hooks, this thrust acting substantially perpendicularly to the front face of the lens 9 and parallel to the rods of the hooks 10 and 11. In this embodiment, the thrust element is a flexible blade 12 carried by the generator system 4 and bearing against the lens 9, while the connection arrangement 4 is turning during assembly.

These housings of the connection arrangement that are to receive the hooks are arranged in such a manner that assembling the connection arrangement on the hooks is performed by pressing against one of the hooks, by turning about that hook, and by snap-fastening on the other hook. This assembly operation is described below.

This thrust applied against one of the hooks, here the bottom hook 11, is linear thrust perpendicular to the front face of the lens 9.

The housing providing this linear thrust against the rod 11B of the hook 11 is formed by two projections 13A and 13B carried by the connection arrangement and spaced apart by a distance that is greater than the diameter of the rod 11B of the hook.

This linear thrust is associated with a skid 14 for applying point thrust against the lens and disposed on the connection arrangement close to the projections 13A and 13B that deliver the thrust. The skid may be made of "Teflon".

The housing providing snap-fastening on the other hook, here the top hook 10, is in the form of a clip 15 carried by the connection arrangement. The clip 15 is laterally open for the snap-fastening and it comes to bear against the sphere 10A of the hook 10.

Preferably, the lens 9, which is shown herein as being a single lens, is one of the lenses of a pair of eyeglasses, possibly also serving to correct eyesight, and the display is a binocular display, with each lens having two such hooks and being designed to receive a respective light beam generator system.

Figure 6:
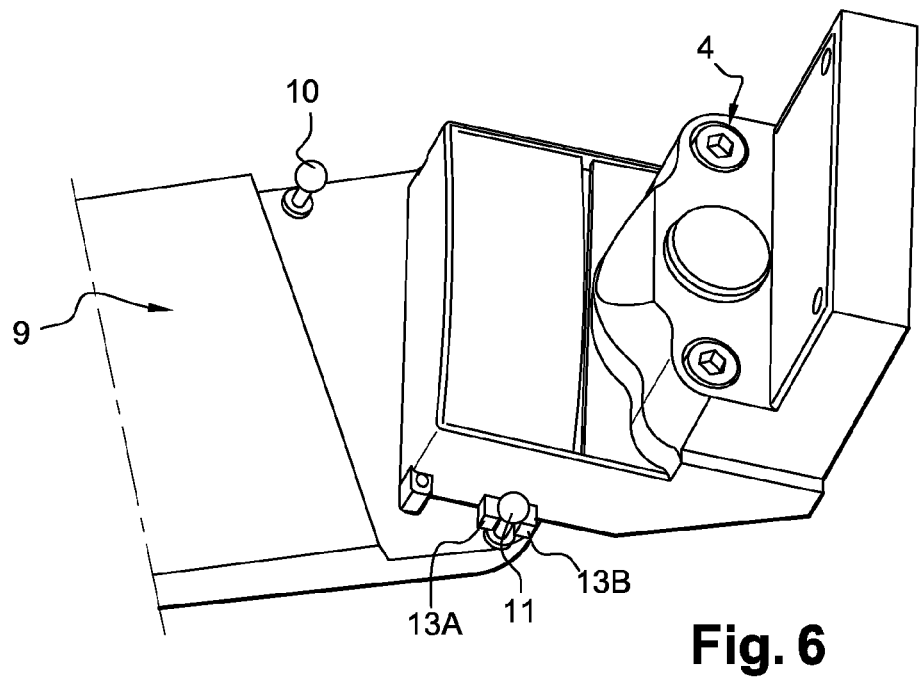
FIGS. 6 and 7 are perspective views from below and from above showing how a display in accordance with the invention is mounted.
Figure 7:
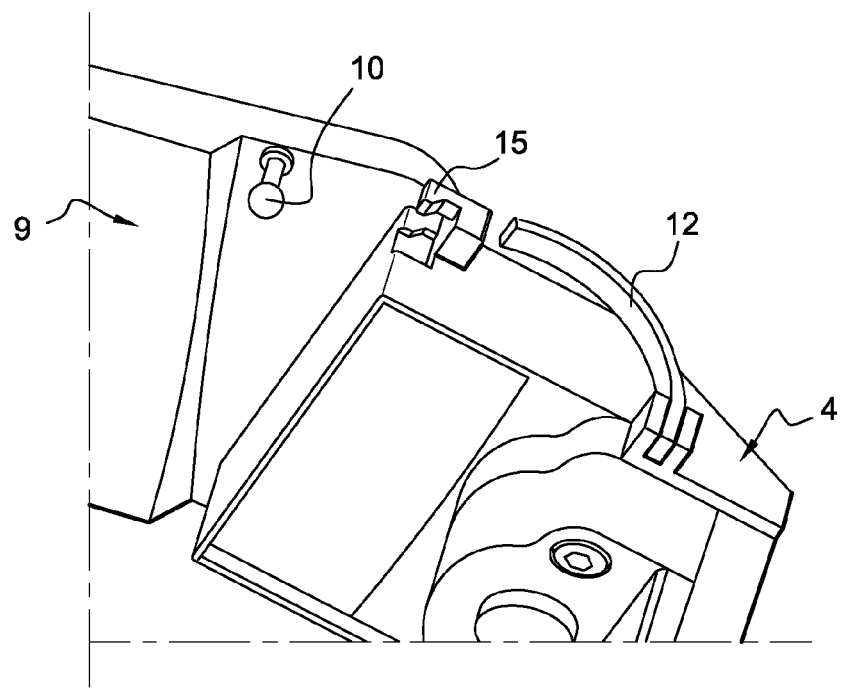

FIGS. 6 and 7 show how the connection arrangement of the light beam generator system 4 is assembled on the hooks 10. and 11 secured to the lens 9.

This assembly is performed initially by thrusting against the bottom hook 11 inserted between the two projections 13A and 13B, while positioning the skid 14 on the lens 9, as shown in the figures.

By turning about this hook thrusting linearly thrust against the projection 13B, and by causing the skid to slide, the generator system is brought into the assembled position as shown in FIGS. 2 to 5, with the shape and the position of the flexible blade 12 ensuring that it automatically positions itself against the lens 9 and exerts its thrust force, with the clip 15 snap-fastening on the top hook 10 at the end of the turning stroke.

The invention claimed is:

1. A display comprising an optical imager for shaping light beams emitted by a light beam generator system, said beams being introduced into said imager via an inlet face, and for directing the beams towards the eye of a wearer in order to enable an image to be viewed, two hooks being in reference positions relative to the imager, and said light beam generator system including a connection arrangement for connection to said hooks, the connection between said system and said hooks being releasable and said hooks being designed to be received in housings carried by the connection arrangement, wherein said housings are arranged in such a manner that said connection arrangement is assembled on said hooks by applying thrust against one of said hooks, by turning about said hook, and by snap-fastening onto the other hook.

2. A display according to claim 1, wherein said imager is incorporated in a lens of a pair of eyeglasses.

3. A display according to claim 2, wherein said display includes a pusher element for pushing said connection arrangement against said hooks (10, 11), said pushing being substantially perpendicular to the front face of said lens (9).

4. A display according to claim 3, wherein said pusher element is a flexible blade carried by said generator system and thrusting against said lens while said connection arrangement is turning.

5. A display according to claim 2, wherein said thrust on one of the hooks is linear thrust perpendicular to the front face of said lens.

6. A display according to claim 5, wherein said linear thrust is associated with a skid for applying point thrust against said lens, the skid being arranged on the connection arrangement close to the housing providing said linear thrust.

7. A display according to claim 2, wherein said hooks are disposed at respective different distances from a side edge of said lens.

8. A pair of eyeglasses having at least one lens including an incorporated imager and provided with two said hooks so as to form a display according to any one of claim 2.

9. A display according to claim 1, wherein each of said hooks is constituted by a sphere disposed at the end of a rod.

10. A display according to claim 9, wherein the housing applying said linear thrust is formed by two projections carried by said connection arrangement and spaced apart from each other by a distance greater than the diameter of the rod of the hook.

11. A display according to claim 1, wherein the housing providing said snap-fastening is formed by a clip carried by said connection arrangement.

12. A display according to claim 1, wherein said hooks are anchored in bores arranged in said inlet face of said imager.

13. A display according to claim 1, wherein said connection arrangement is machined or molded in a plate of said light beam generator system.

* * * * *